United States Patent [11] 3,627,346

[72] Inventors Nikolaus Dorner
Kipfenberg;
Albert Dillenburger, Buchholz, both of Germany
[21] Appl. No. 8,602
[22] Filed Feb. 4, 1970
[45] Patented Dec. 14, 1971
[73] Assignee Stabilus Industrie- und Handelsgesellschaft mbH
Koblenz-Neuendorf, Germany
[32] Priority Feb. 4, 1969
[33] Germany
[31] P 19 05 306.6

[54] STEERING MOVEMENT TRANSMISSION SYSTEM FOR VEHICLES
7 Claims, 3 Drawing Figs.
[52] U.S. Cl. ........................................... 280/90, 280/96
[51] Int. Cl. ........................................... B62d 3/12
[50] Field of Search ........................................... 280/90, 96; 180/79.2; 188/312, 317, 322

[56] References Cited
UNITED STATES PATENTS

| | | | |
|---|---|---|---|
| 1,928,816 | 10/1933 | Grayson | 280/90 |
| 1,958,810 | 5/1934 | Berg | 280/90 |
| 2,261,155 | 11/1941 | Hedrick | 280/90 |
| 2,992,815 | 7/1961 | Ellis | 188/312 X |
| 3,000,457 | 9/1961 | Randol | 180/79.2 |
| 3,085,645 | 4/1963 | Bookout et al. | 180/79.2 |

FOREIGN PATENTS

| | | | |
|---|---|---|---|
| 359,985 | 3/1962 | Switzerland | 280/96 |
| 1,292,018 | 4/1969 | Germany | 280/90 |

Primary Examiner—Kenneth H. Betts
Attorney—Kelman and Berman

ABSTRACT: Steering systems for vehicles comprise transmission members connected in series with one another. These transmission members transmit the rotational movements of the steering wheel to the road wheels for control of the direction of the road wheels. The transmission elements include a hydraulic damping cylinder which prevents heavy shocks from the road wheels from reaching the steering wheel and wobbling of the road wheels.

STEERING MOVEMENT TRANSMISSION SYSTEM FOR VEHICLES

This invention relates to steering systems having a hydraulic damping device.

Steering systems with which this invention is more specifically concerned comprise a hydraulic damping device connected to one of the transmission members. A known damping device comprises a liquid-containing cylinder fixed with respect to the vehicle frame, a piston rod slidingly guided in the said cylinder and connected to said transmission member, and a damping piston fixed to said piston rod and having at least one restricted flow passage.

The known damping device is a closed unit which is arranged between a support fixed with respect to the vehicle frame and one of the transmission members. Such damping devices form additional parts of the usual steering systems and comprise a plurality of subparts.

The primary object of this invention is the provision of a steering system for vehicles which avoids the shortcomings of the aforedescribed known devices, while retaining their desirable features.

With this object in view, the steering system of this invention provides a piston rod which extends beyond both ends of the cylinder cavity and is one of the transmission members.

Other features, additional objects, and many of the attendant advantages of this invention will be readily appreciated as the same becomes better understood by reference to the following detailed description of preferred embodiments when considered in connection with the accompanying drawings in which.

Figure 1:
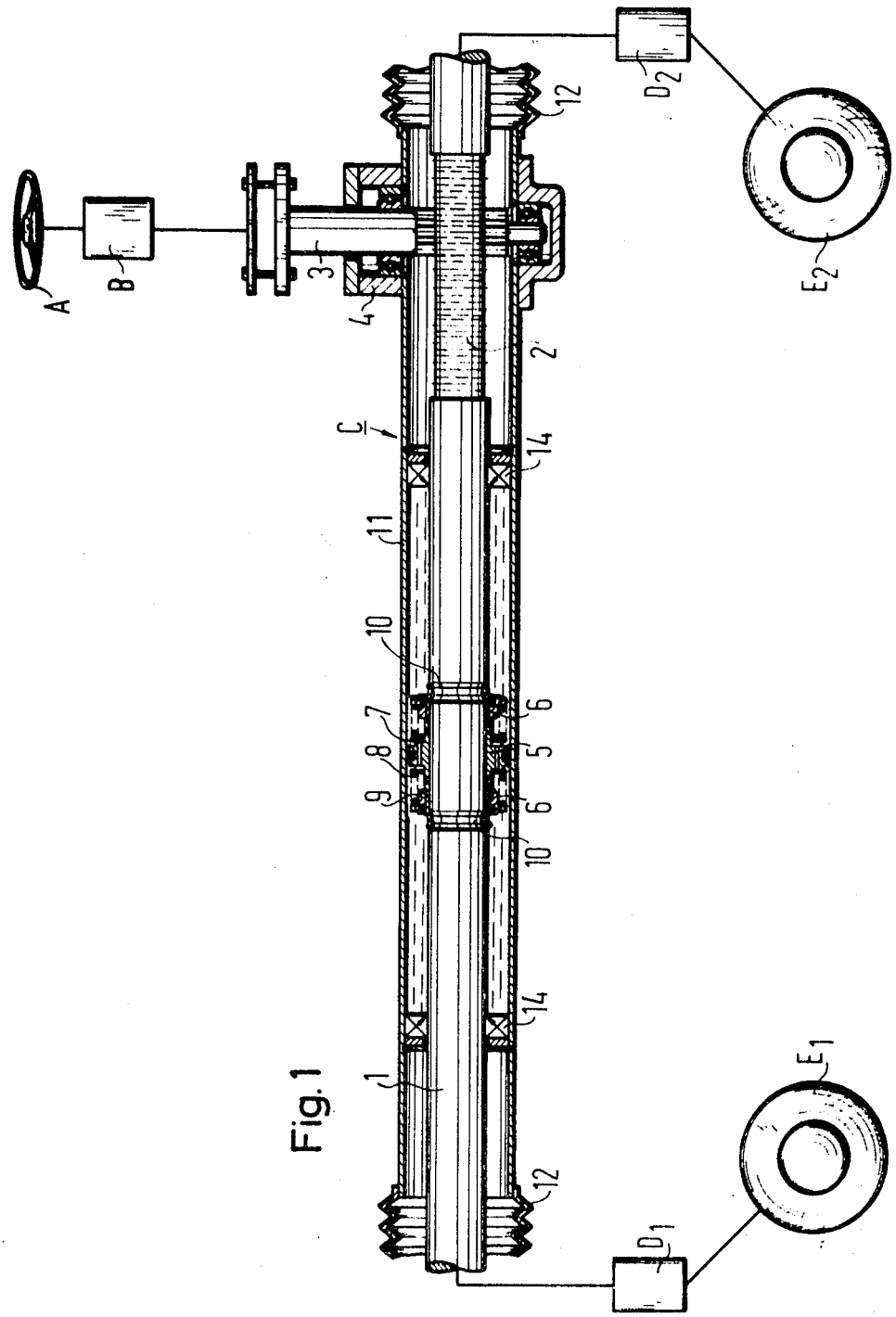
FIG. 1 shows a steering system of the invention, partly in section, partly in a diagrammatic way.

Referring now to the drawing in detail, and initially to FIG. 1, there is shown as much of a steering system of the invention as is necessary for understanding of its novel features.

The steering wheel A is operationally connected by a series of transmission members B, C, $D_1$ and $D_2$ to the road wheels $E_1$ and $E_2$.

The transmission element C comprises a rod 1 with a rack 2 which is engaged by a steering pinion 3. This steering pinion 3 is connected by a flange or Hardy disc with a steering column not visible in the drawing. A gear housing 4 is used for rotatably mounting the steering pinion 3 on a cylinder 11. To the rod 1 is fixed a damping piston 5, this damping piston having tubular extensions 6 on both axial ends which are embossed or rolled to engage grooves 10 of the rod 1. The damping piston 5 has axial passages which are covered by valve discs 7; coil springs 8 are abuttingly retained between the said valve discs 7 at one end, and valve abutment discs 9 at the other end. To avoid a fouling of the rod 1, dust sleeves 12 are fixed to both ends of the cylinder. Gaskets 14 within the cylinder 11 and not movable in the axial direction define a working chamber or cavity in the cylinder 11. The said working chamber is filled with liquid and sealed by the gaskets 14. The element C shown in FIG. 1 is mounted on the vehicle in such a way that the cylinder 11, and thereby the gear housing 4, are fixed to the vehicle frame, while the steering movement is transmitted by means of the steering pinion 3 and the rack 2 to the rod 1 which moves in an axial direction. The desired damping effect can be determined by choosing accordingly the coil springs 8 and giving them an initial stress by means of the abutment discs 9.

Figure 2:
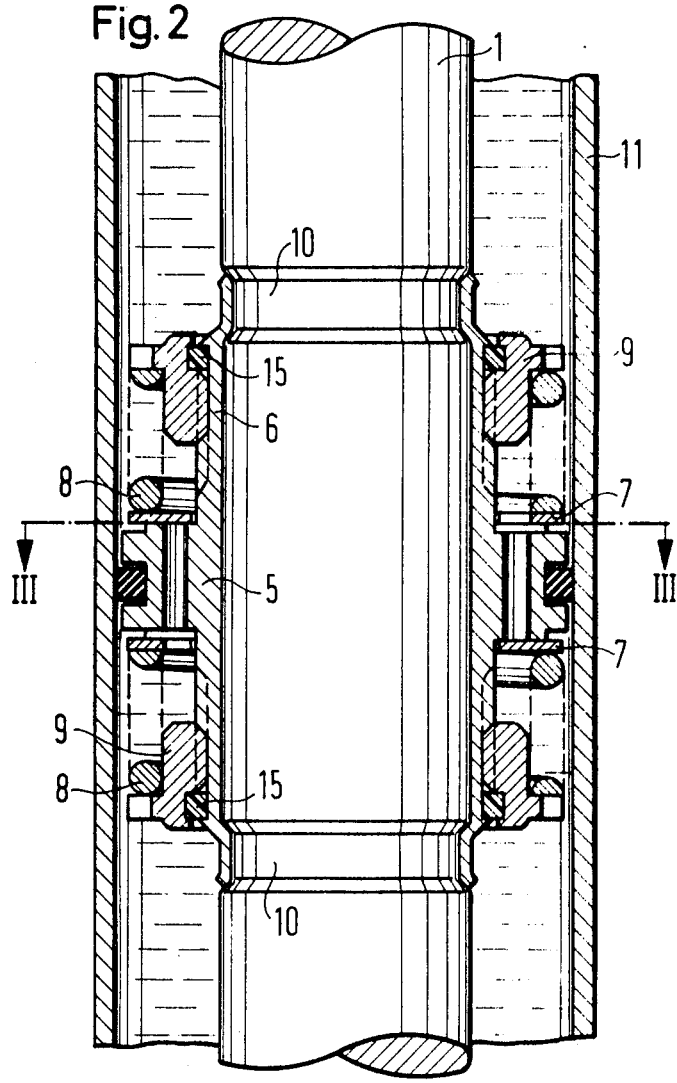
FIG. 2 illustrates the damping device of the system of FIG. 1 in an enlarged section.

As is better seen in FIG. 2, the damping piston 5 is attached to the rod 1 by tubular extensions 6 engaging annular grooves 10 in the rod 1. The valve discs 7 covering the flow channels within the piston are provided with radial slots on their inner circumference, thus covering only one-half of the flow channels at one end of the piston. At the other end of the piston the valve discs 7 on the covered flow channels are provided with recesses, perfect damping thus being assured in both directions of movement of the piston. The spring abutment discs 9 fixed on a thread of the extensions 6 permit the stress of the coil spring 8 to be adjusted in a simple way.

Figure 3:
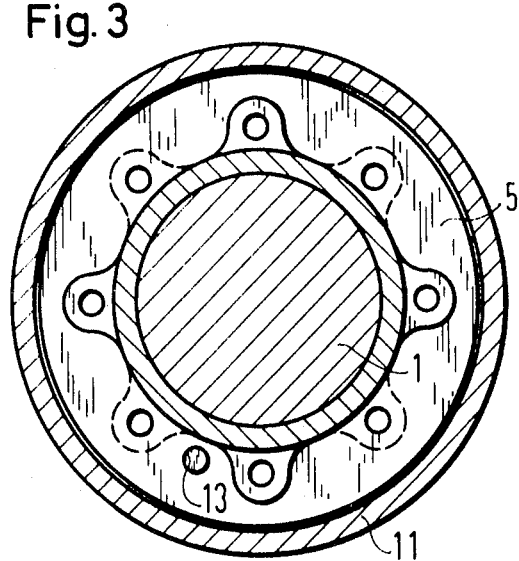
FIG. 3 shows a section on the line III—III of FIG. 2.

A pin 13 extending beyond both ends of the piston guides the valve discs 7 in an axial direction while preventing rotation, as is shown in FIG. 3. In this way it is possible to use identical valve discs for both piston ends by mounting them inversely. The series of flow channels in the piston which at one end is covered by the valve disc 7, is thus uncovered at the other end of the piston by the valve disc 7.

In order to maintain the initial stress of the coil spring 8 during operation, the spring abutment discs are provided with plastic locking rings 15 which prevent any undesired movement of the springs abutment disc 9 on the thread of the tubular extension 6.

The invention shall not be limited to the embodiment described by way of example in the present specification, but may be modified in any way within the scope of the appended claims. The seat of the valve discs 7 on the piston surface, for instance, may be of different shape than illustrated. Equally the present invention shall not be restricted to rack-and-pinion steering but may be applied by analogy to other types of steering systems.

What is claimed is:

1. In a steering system for a vehicle having a frame, a steering wheel, and a plurality of road wheels on said frame, the steering system including a plurality of transmission members connected to each other in series and operatively interposed between said steering wheel and at least one of said road wheels, and hydraulic damping means for damping transmission of shock from said one road wheel to said steering wheel, said damping means including a cylinder fixedly mounted on said frame and having an axis, a damping piston axially guided in said cylinder and connected to one of said transmission members, said piston being axially apertured, and liquid in said cylinder for flow through said piston, the improvement in the damping means which comprises:
   a. a piston rod in said cylinder;
   b. a plurality of sealing means axially spaced and sealing a cavity in said cylinder,
      1. said piston rod extending axially through said sealing means and outward of said cavity in both axial directions,
      2. said piston rod being formed with a groove in said cavity;
   c. a tubular extension coaxially projecting from said damping piston,
      1. said extension conformingly engaging said groove and thereby fixedly fastening said piston to said piston rod in said cavity,
      2. said piston rod being said one transmission member.

2. In a system as set forth in claim 1, said piston rod being provided with a rack, a pinion being another transmission member and engaging said rack.

3. In a system as set forth in claim 2, a gear housing on said cylinder, said pinion being rotatably received in said gear housing.

4. In a system as set forth in claim 1, an external thread on said tubular extension, an abutment disc threadedly adjustable on said thread, a valve disc superposed on an aperture in said damping piston, and a coil spring axially interposed between said abutment disc and said valve disc.

5. In a steering system for a vehicle having a frame, a steering wheel, and a plurality of road wheels on said frame, the steering system including a plurality of transmission members connected to each other in series and operatively interposed between said steering wheel and at least one of said road wheels, and hydraulic damping means for damping transmission of shock from said one road wheel to said steering wheel, said damping means including a cylinder fixedly mounted on said frame and having an axis, a damping piston axially guided in said cylinder and connected to one of said transmission members, said piston being axially apertured, and liquid in said cylinder for flow through said piston, the improvement in the damping means which comprises:

a. a piston rod axially extending through said cylinder beyond both axial ends of the cylinder in movable sealing engagement with the same,
   1. the piston rod being fixedly fastened to said piston, and constituting said one transmission member,
   2. said piston being formed with a plurality of passages extending axially therethrough;
b. a valve disc on each axial end of said piston; and
c. a cylindrical pin axially extending from each axial end of said piston and engaging a recess in a respective valve disc.

6. In a system as set forth in claim 5, yieldably resilient means biasing each valve disc axially toward said piston.

7. In a steering system for a vehicle having a frame, a steering wheel, and a plurality of road wheels on said frame, the steering system including a plurality of transmission members connected to each other in series and operatively interposed between said steering wheel and at least one of said road wheels, and hydraulic damping means for damping transmission of shock from said one road wheel to said steering wheel, said damping means including a cylinder fixedly mounted on said frame and having an axis, a damping piston axially guided in said cylinder and connected to one of said transmission members, said piston being axially apertured, and liquid in said cylinder for flow through said piston, the improvement in the damping means which comprises:

a. a piston rod axially extending through said cylinder and beyond both axial ends of the cylinder in movable, sealing engagement with the cylinder,
   1. said piston rod being fastened to said piston, and constituting said one transmission member,
   2. the piston being formed with a plurality of passages axially extending therethrough;
b. an annular valve disc on each axial end of said piston,
   1. each valve disc being formed with a radial slot in the inner circumference thereof aligned with one of said passages.

* * * * *